US012770446B2

(12) United States Patent
Lessard et al.

(10) Patent No.: US 12,770,446 B2
(45) Date of Patent: Oct. 20, 2026

(54) METHOD OF OPERATING AN ELECTRONIC LOCK LOCKING A COMMUNITY ASSET, AND ELECTRONIC LOCK SYSTEM

(71) Applicant: DORMAKABA CANADA INC., Montréal (CA)

(72) Inventors: Michel Lessard, Greenfield Park (CA); Xiao Qiang Zhou, Brossard (CA); Farnaz Abbasi, Brossard (CA); Alberto Palomar Robledo, Madrid (ES)

(73) Assignee: DORMAKABA CANADA INC., Montreal (CA)

( * ) Notice: Subject to any disclaimer, the term of this patent is extended or adjusted under 35 U.S.C. 154(b) by 243 days.

(21) Appl. No.: 18/548,383

(22) PCT Filed: Mar. 8, 2022

(86) PCT No.: PCT/CA2022/050331
§ 371 (c)(1),
(2) Date: Aug. 30, 2023

(87) PCT Pub. No.: WO2022/187947
PCT Pub. Date: Sep. 15, 2022

(65) Prior Publication Data

US 2024/0141695 A1 May 2, 2024

Related U.S. Application Data

(60) Provisional application No. 63/158,438, filed on Mar. 9, 2021.

(51) Int. Cl.
*G07C 9/00* (2020.01)

(52) U.S. Cl.
CPC ..... *G07C 9/00309* (2013.01); *G07C 9/00857* (2013.01); *G07C 2009/00865* (2013.01)

(58) Field of Classification Search
CPC ............ G07C 9/00309; G07C 9/00857; G07C 2009/00865; G07C 2009/00412;
(Continued)

(56) References Cited

U.S. PATENT DOCUMENTS 1,124,392 A * 1/1915 Chester .................. F23H 11/00 122/292
5,774,059 A * 6/1998 Henry ................ G07C 9/00912 235/382

(Continued)

FOREIGN PATENT DOCUMENTS

EP 3293995 A1 3/2018
JP 2019173306 10/2019
WO 2017066409 4/2017

*Primary Examiner* — Nam V Nguyen
(74) *Attorney, Agent, or Firm* — Reno Lessard; Norton rose fulbright Canada LLP

(57) ABSTRACT

There is described a method of operating an electronic lock locking a community asset and controlled by a community controller via a network, with the community controller being communicatively coupled to a first mobile device and to a second mobile device. The method generally has: the community controller communicating a mobile key unlocking the electronic lock to the first mobile device; the community controller receiving, from the second mobile device, a request to cancel the mobile key communicated to the first mobile device, the first mobile device being associated to first user profile information and the second mobile device being associated to second user profile information different from the first user profile information; and the community controller assessing the request and canceling the mobile key communicated to the first mobile device based on said assessing.

17 Claims, 6 Drawing Sheets

(58) Field of Classification Search
CPC ........ G07C 2009/0088; G07C 9/00571; G07C 9/27; G07C 2209/02; G07C 2209/04; G07C 2209/08; G07C 9/00; E05B 49/00; H04W 12/04; H04W 12/082
USPC ............................... 340/5.2, 5.64; 455/426.1
See application file for complete search history.

(56) References Cited

U.S. PATENT DOCUMENTS

| | | | | |
|---|---|---|---|---|
| 8,787,902 | B2 | 7/2014 | Kim | |
| 9,595,145 | B2 * | 3/2017 | Avery | B60R 25/01 |
| 10,171,974 | B2 * | 1/2019 | Ahearn | H04W 4/80 |
| 10,181,231 | B2 | 1/2019 | Kristensen et al. | |
| 10,289,861 | B2 * | 5/2019 | Anderson | G06F 21/6227 |
| 10,776,613 | B1 * | 9/2020 | Schneider | G06Q 50/40 |
| 10,810,811 | B2 * | 10/2020 | Kwon | G07C 9/00182 |
| 10,817,612 | B2 * | 10/2020 | Wakabayashi | G06F 21/575 |
| 10,820,203 | B2 * | 10/2020 | Robinton | H04W 4/80 |
| 12,027,001 | B2 * | 7/2024 | Kirkjan | G07C 9/00309 |
| 12,154,399 | B2 * | 11/2024 | Baratti | B60R 25/24 |
| 12,205,429 | B2 * | 1/2025 | Kuenzi | G07C 9/257 |
| 2014/0120905 | A1 | 5/2014 | Kim | |
| 2016/0019733 | A1 * | 1/2016 | Robinton | H04W 4/023 340/5.61 |
| 2017/0098335 | A1 * | 4/2017 | Payack, Jr. | G07C 9/20 |
| 2017/0352215 | A1 * | 12/2017 | Maiwand | G07C 9/00309 |
| 2019/0279448 | A1 | 9/2019 | Kwon et al. | |
| 2020/0090441 | A1 * | 3/2020 | Kuenzi | H04W 12/63 |

* cited by examiner

METHOD OF OPERATING AN ELECTRONIC LOCK LOCKING A COMMUNITY ASSET, AND ELECTRONIC LOCK SYSTEM

FIELD

The improvements generally relate to electronic locks locking community asset(s), and more particularly relate to network-based management of mobile keys unlocking such electronic locks.

BACKGROUND

Technology-friendly users generally almost always have within reach one or more mobile devices such as smartphones or tablets equipped with appropriate software applications. It is thus no surprise that some of these users prefer wirelessly controllable electronic locks which can be locked and unlocked using mobile keys stored on such mobile devices via an intuitive user interface. Although existing electronic lock systems are satisfactory, there remains room for improvement, especially when users want to manage one or more mobile keys shared to visitors, for instance.

SUMMARY

In accordance with a first aspect of the present disclosure, there is provided a method of operating an electronic lock locking a community asset and controlled by a community controller via a network, the community controller being communicatively coupled to a first mobile device and to a second mobile device, the method comprising: the community controller communicating a mobile key unlocking the electronic lock to the first mobile device; the community controller receiving, from the second mobile device, a request to cancel the mobile key communicated to the first mobile device, the first mobile device being associated to first user profile information and the second mobile device being associated to second user profile information different from the first user profile information; and the community controller assessing the request and canceling the mobile key communicated to the first mobile device based on said assessing.

In accordance with a second aspect of the present disclosure, there is provided a electronic lock system for controlling access to a community asset, the system comprising: an electronic lock locking the community asset; a community controller being communicatively coupled to the electronic lock, a first mobile device and a second mobile device via a network, the first mobile device having a mobile key unlocking the electronic lock stored on a memory thereof and first user profile information, the second mobile device having second user profile information different from the first user profile information, the community controller having a processor and a memory having stored thereon instructions that when executed by the processor perform the steps of: receiving, from the second mobile device, a request to cancel the mobile key of the first mobile device; assessing the request and canceling the mobile key of the first mobile device based on said assessing.

In accordance with a third aspect of the present disclosure, there is provided a method of operating an electronic lock locking a community asset and in communication to a network-based communication system, the method comprising: communicatively coupling a first mobile device to the network-based communication system using first user profile information, the first mobile device having stored on a memory thereof a mobile key unlocking the electronic lock; communicatively coupling a second mobile device to the network-based communication system using second user profile information different from the first user profile information; and the second mobile device transmitting a request to cancel the mobile key of the first mobile device to the network-based communication system.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
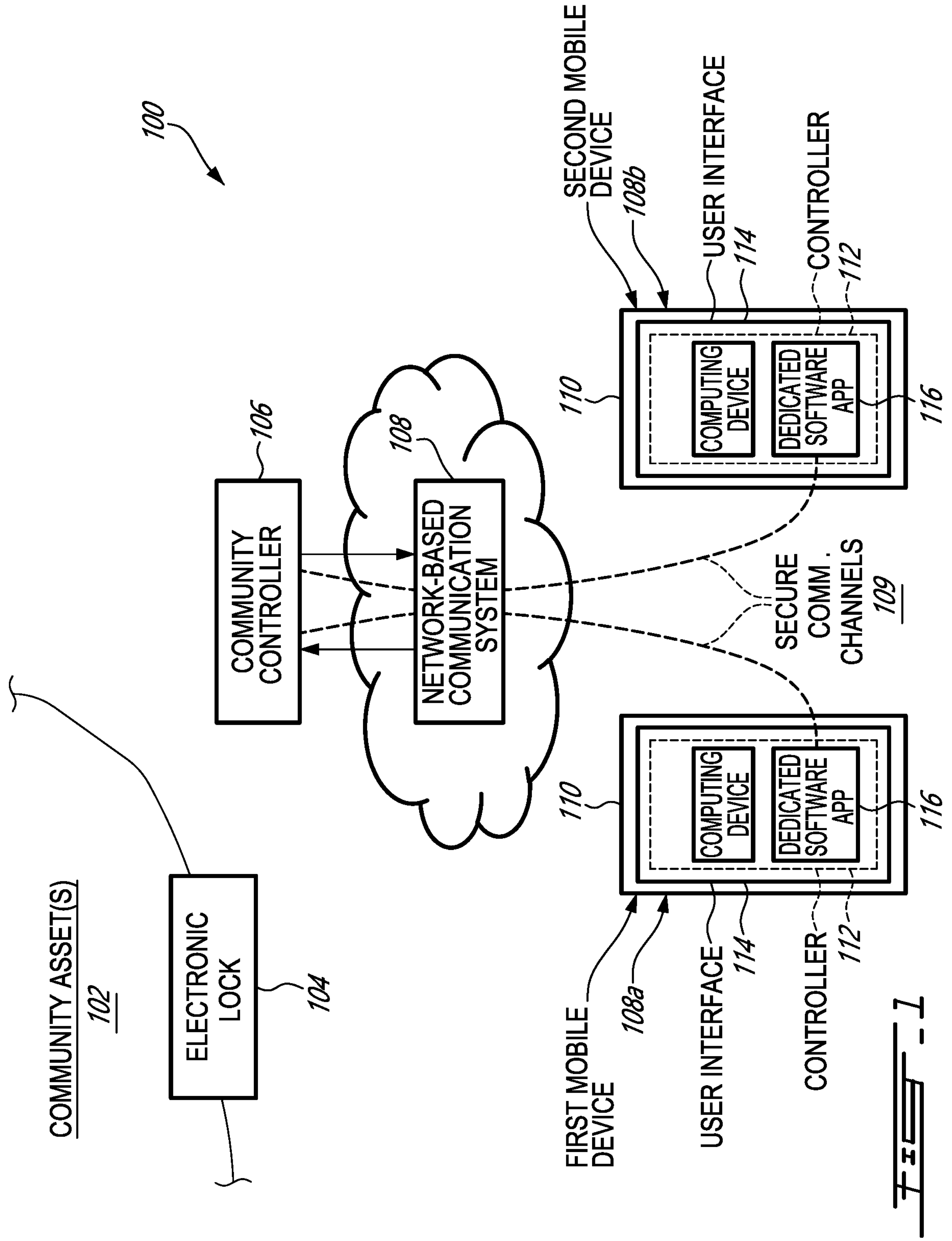
FIG. 1 is a schematic view of an example of electronic lock system having an electronic lock, and a community controller communicatively coupled to first and second mobile devices via a network, in accordance with one or more embodiments.

FIG. 1 shows an example of an electronic lock system 100 for controlling access to one or more community asset(s) 102, in accordance with one or more embodiments. The community asset 102 can be provided in the form of a gate of a gated community, a community clubhouse, a personal house, a community gym or pool, a maintenance facility and the like. The community asset is to be accessed by host users such as residents living within the community and staff working within the community. Visitors may be provided with temporary and cancelable access to the community asset(s) as will be described below.

As depicted, the electronic lock system 100 has one or more electronic locks 104 locking the community asset(s) 102. The electronic locks 104 can be provided in any type of wirelessly controllable electronic lock including, but not limited to, an electromagnetic lock, an electronic strike lock, an electronic deadbolt lock, an electronic latch locks, a passive electronic lock and the like. The electronic lock can be unlocked using a mobile key provided in the form of a personal identification number (PIN) or any other suitable numerical code, an electronic wallet pass, a password, a passphrase, a security token, a radio-frequency identifier (RFID), and the like.

As shown, the electronic lock 104 is controllable by a community controller 106 via a network-based communication system 108. The community controller 106 is typically communicatively coupled to a number of mobile devices 108 including, but not limited to, a first mobile device 108*a* and a second mobile device 108*b* such as shown in FIG. 1. Preferably, the communicative coupling between the community controller 106 and the first and second mobile devices 108*a* and 108*b* can be secure communication channels 109, for instance.

As depicted, each mobile device 108 has a housing 110, a mobile device controller 112 enclosed within the housing 110 and running an operating system and other software application(s), and a user interface 114 communicatively coupled to the mobile device controller 112. The mobile device controller 112 can have hardware components implemented in the form of a computing device and software components implemented in the form of one or more operating system(s) and software application(s). In some embodiments, the first and second mobile devices 108*a* and 108*b* can download a software application dedicated to the management of the mobile key communicated to and from the community controller 106. This software application may be referred to as "the dedicated software application 116" in the following paragraphs. In some embodiments, the secure communication occurring between the community controller 106 and the mobile devices 108*a* and 108*b* is ensured by encryption and decryption modules which are part of the dedicated software applications 116. As such, any mobile key that may be shared between the community controller 106 and the first and second mobile devices 108*a* and 108*b*, or between the first and second mobile devices 108*a* and 108*b* themselves, may be made in a secure manner.

The community controller 106 can be provided as a combination of hardware and software components. The hardware components can be implemented in the form of a computing device 200, an example of which is described with reference to FIG. 2. Moreover, the dedicated software applications 116 which are to be run by the community controller 106 and by the first and second mobile devices 108*a* and 108*b* can be implemented in the form of software components and modules, examples of which are described with reference to FIGS. 3A and 3B.

Figure 2:
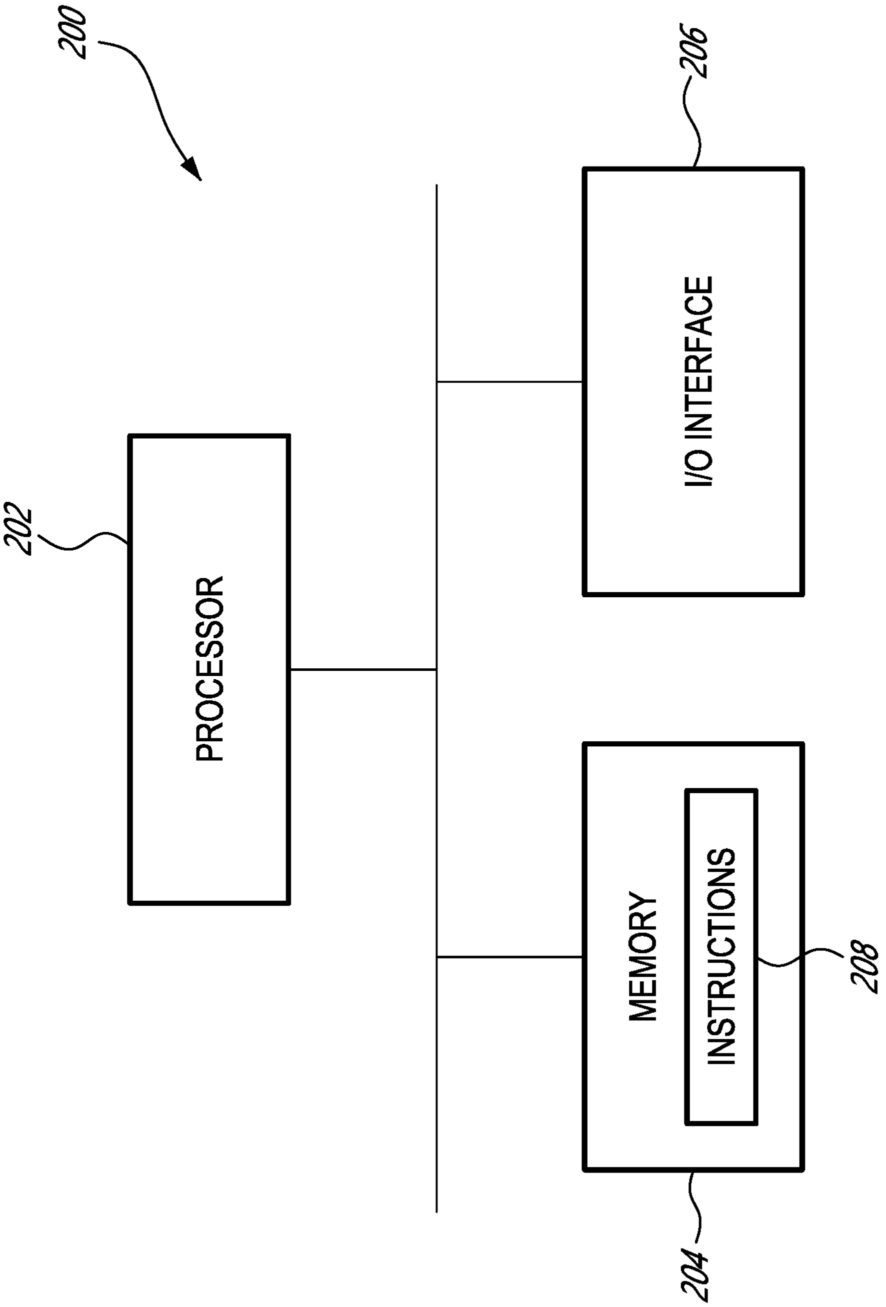
FIG. 2 is a schematic view of an example of a computing device of the community controller of FIG. 1, in accordance with one or more embodiments.

Referring specifically to FIG. 2, the computing device 200 can have a processor 202, a memory 204, and I/O interface 206. Instructions 208 for operating the electronic lock, and managing mobile key(s), can be stored on the memory 204 and accessible by the processor 202.

The processor 202 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 204 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 206 enables the computing device 200 to interconnect with one or more input devices, such as mouse(s), keyboard(s), electronic lock(s), input sensor(s), or with one or more output devices such as display(s), computer-readable memory(ies), and external network(s) or database(s).

Each I/O interface 206 enables the community controller to communicate with other components, to exchange data with other components, to access and connect to network resources, to server applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

In this example, the first mobile device 108*a* has a mobile key unlocking the electronic lock stored on a memory thereof and first user profile information whereas the second mobile device 108*b* has second user profile information different from the first user profile information. Accordingly, as each of the first and second mobile devices 108*a* and 108*b* are associated to different profile information, it may be assumed that the first and second mobile devices are owned and manipulated by different people such as host user and a visitor user. To describe this embodiment, the first mobile device 108*a* can be referred to as the visitor mobile device 108*a* and the second mobile device 108*b* can be referred to as the host mobile device 108*b*. More than one host mobile device and more than one visitor mobile device can be provided in other embodiments.

Figure 3A:
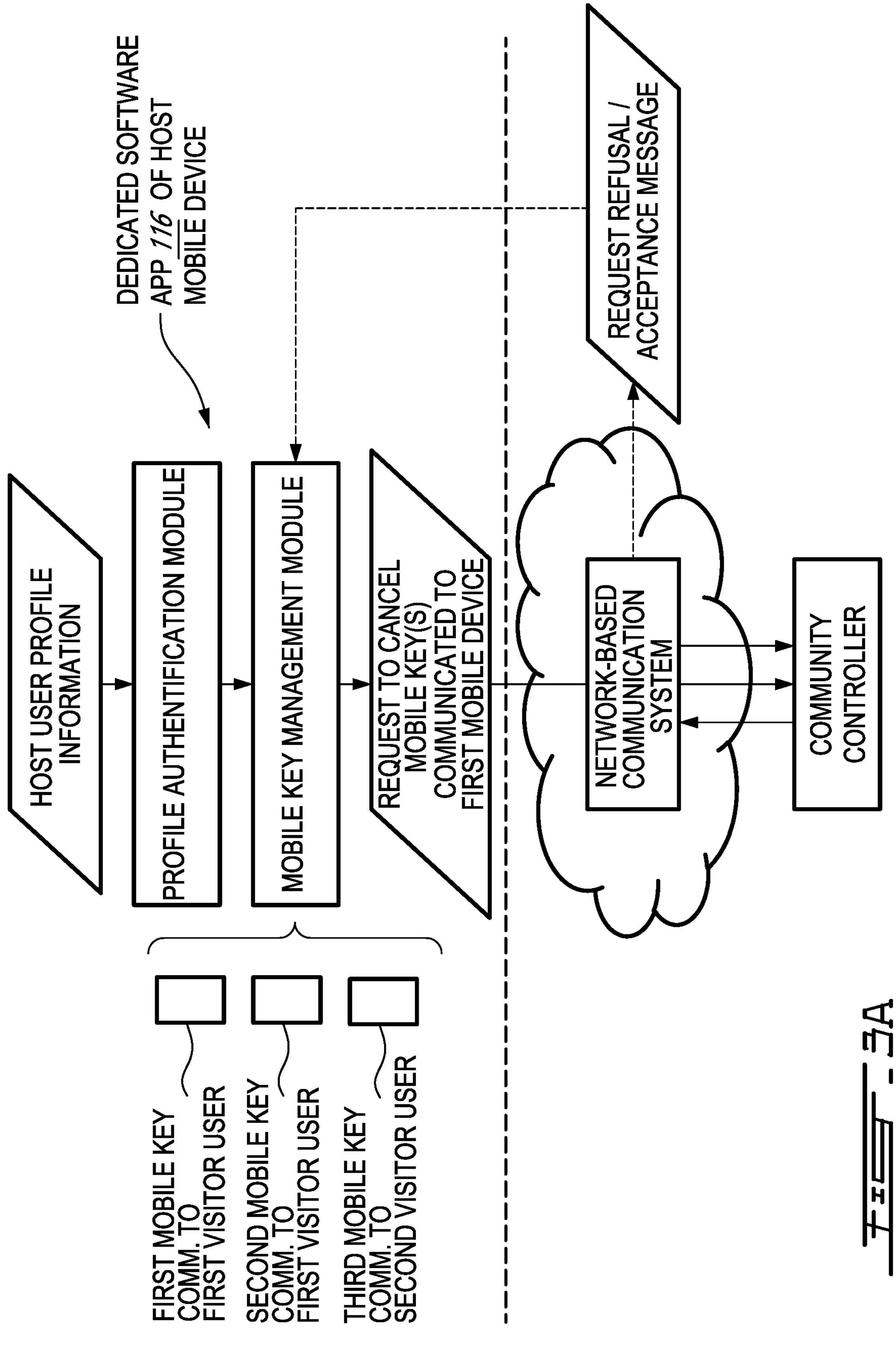
FIGS. 3A and 3B are schematic views of example software applications run on the first and second mobile devices of FIG. 1, in accordance with one or more embodiments.

Referring now to FIG. 3A, a schematic view of the dedicated software application 116 of the host mobile device 108*b* is shown. As can be appreciated, the dedicated software application 116 has a profile authentication module which receives, via the user interface, host user profile information and authenticates them. Upon authenticated, or otherwise suitably logged in in the dedicated software application, the host user may be exposed to a number of mobile key(s) communicated to its visitor users via a mobile key management module. In this example, the mobile key management module shows a first mobile key communicated to a first visitor user, a second mobile key communicated to the first visitor user, and a third mobile key communicated to a second visitor user, for instance. At any time, the host user can request to cancel one or more mobile key(s) communicated to its visitor user(s) via the mobile key management module. When such a request is made, it is communicated to the community controller via the network-based communication system. As described in further detail below, the community controller will then assess the request and in some circumstances refuse or accept the request, and correspondingly cancel the mobile key(s) communicated to the visitor mobile device. In such event, a request refusal message or a request acceptance message may be sent back from the community controller to the host mobile device via the network-based communication system.

Figure 3B:
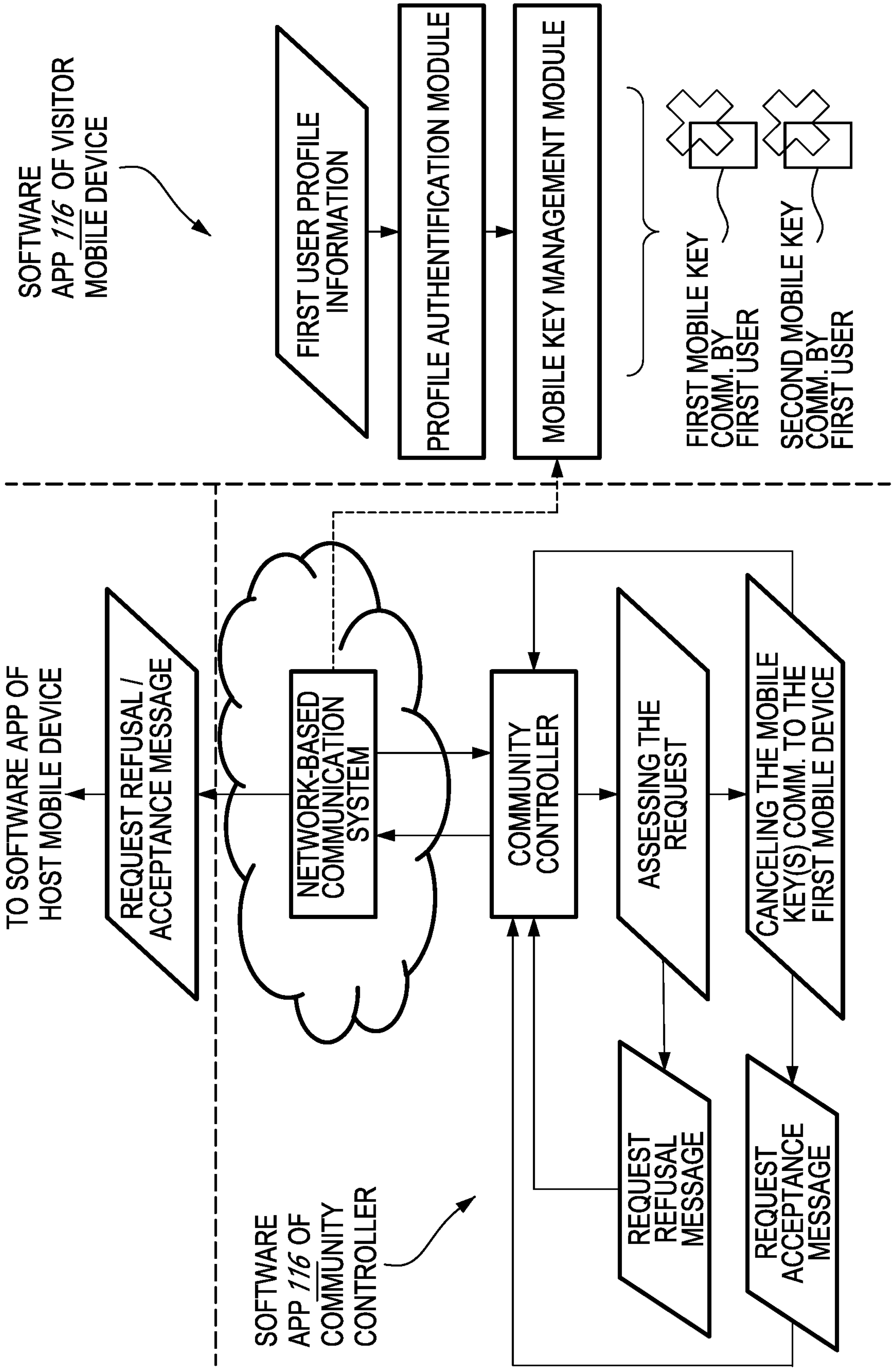

As shown in FIG. 3B, the community controller, or a dedicated app thereof, may assess the request. Upon refusal of the request, a request refusal message is sent from the community controller to the host mobile device. Upon acceptance of the request, the community controller is configured for not only sending a request acceptance message to the host mobile device but also cancel the mobile key(s) communicated to the visitor mobile device. As can be appreciated, the visitor mobile device has a dedicated software application with a profile authentication module which receives, via the user interface, visitor user profile information and authenticates them upon reception. Upon authenticated, or otherwise suitably logged in in the dedicated software application, the visitor user may be exposed to a number of mobile key(s) communicated by host user(s) via a mobile key management module. As shown, the community controller may can cancel the mobile key(s) as per the request made by the host mobile device. In some embodiments, the cancelation of the mobile key(s) mentioned in the request may be made by removing the mobile key(s) from a database listing all currently active mobile key(s) for the electronic lock. In some other embodiments, the community controller can instruct the mobile key management module of the dedicated software application of the visitor mobile device to delete the mobile key(s) mentioned in the request.

The computing device 200 and the software applications described above are meant to be examples only. Other suitable embodiments of the community controller can also be provided, as it will be apparent to the skilled reader.

Figure 4:
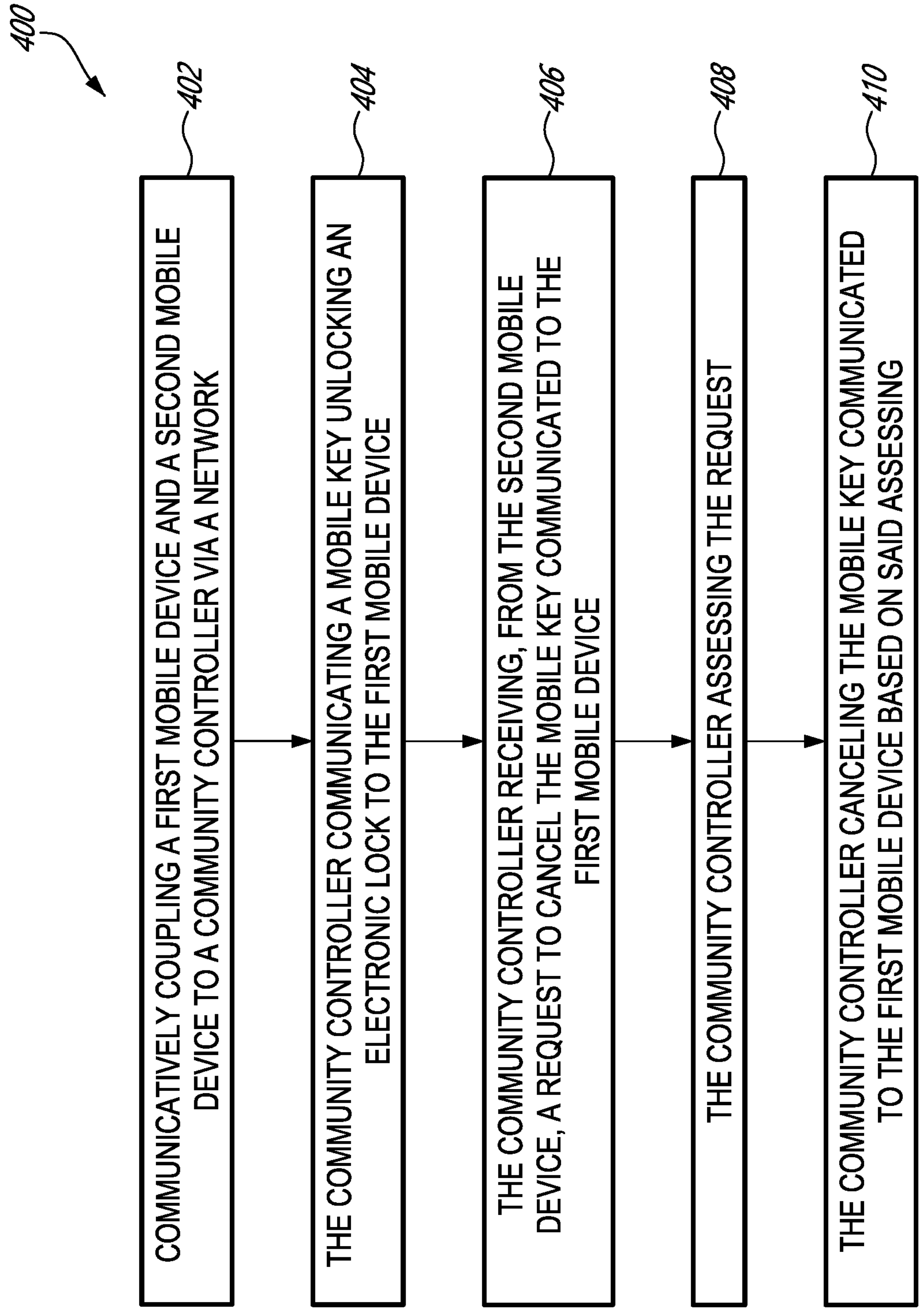
FIG. 4 is a flow chart of an example method of operating an electronic lock, in accordance with one or more embodiments.

FIG. 4 shows an example of a method 400 of operating an electronic lock locking a community asset and controlled by a community controller via a network. In some embodiments, the community controller and the first mobile device communicate with one another via the network using a secure communication protocol e.g., an advanced encryption standard such as the AES-128, AES-192, AES-256 and the like. In some embodiments, the community controller and the second mobile device communicate with one another via the network using a secure communication protocol e.g., an advanced encryption standard such as the AES-128, AES-192, AES-256 and the like. Accordingly, in some embodiments, a direct communication link between the first and second mobile devices is not required.

At step 402, the community controller is communicatively coupled to a first mobile device and to a second mobile device via the network. As discussed above, the communicative coupling between the community controller and the first mobile device may independent from the communicative coupling between the community controller and the second mobile device. The communicative coupling between the first and second mobile devices and the community controller can be allowed by the first and second mobile devices registering with the community controller via a dedicated software app downloadable from an online application store, for instance. Once downloaded, the first and second users can input corresponding user profile information such as a name, an email, a phone number and the like, along with a carefully chosen passwords.

At step 404, the community controller communicates a mobile key unlocking the electronic lock to the first mobile device. In some embodiments, the mobile key is communicated to the first mobile device upon request of the second mobile device. For instance, the second mobile device can be a mobile device owned by a host of a gated community, for instance, whereas the first mobile device can be a mobile device owned by a visitor of that host. As such, the host may request to the community controller that a mobile key, e.g., unlocking an electronic lock of their house, be communicated to the first mobile device. The number of mobile key(s) can vary from one embodiment to another. For instance, in some embodiments, a plurality of mobile keys can be communicated to the first mobile device as per a single (or multiple) simultaneous or sequential request(s).

At step 406, the community controller receives, from the second mobile device, a request to cancel the mobile key communicated to the first mobile device. It is appreciated that the first mobile device is associated to first user profile information, e.g., the visitor user, and the second mobile device is associated to second user profile information, e.g., the host user, different from the first user profile information. As such, in some embodiments, it can be demonstrated that the first and second mobile devices are operated by different users. As such, the request would have the consequence of preventing the visitor user from unlocking any of the electronic locks which they could unlock before.

At step 408, the community controller assesses the request received from the second mobile device. The assessment of the request can include, but not limited to, a verification as to whether the second user profile information has mobile key cancelation privilege. This assessment can be performed by looking up a local or remote database, for instance. In some embodiments, the step 408 of assessing can include a step of the community controller determining whether the second mobile device also has the mobile key, or any mobile key, unlocking the same electronic lock. In these embodiments, as the second mobile device is deemed to possess the mobile key unlocking the electronic lock, it is assumed that the second mobile device is allowed to control the access to the electronic lock. In some embodiments, the step 408 of assessing can include a step of the community controller verifying which mobile device has requested that the mobile key be shared to the first mobile device in the first place. In these embodiments, it may be assumed that the second mobile device has mobile key cancelation privilege if the second mobile device is the mobile device that initially requested that the mobile key be shared to the first mobile device.

At step 410, the community controller cancels the mobile key of the second mobile device based on the assessing of step 408. For instance, in some embodiments, if the community controller determines that the second mobile device has in fact mobile key cancelation privilege, the community controller may therefore cancel the mobile key of the first mobile device. In some other embodiments, the mobile key can be canceled right away regardless of whether the second mobile has the mobile key cancelation privilege. In some embodiments, the step 410 of canceling includes a step of the community controller instructing the first mobile device to delete to mobile key from its software app, and/or from a memory thereof. In some embodiments, the step 410 of canceling includes a step of the community controller rendering the mobile key communicated to the first mobile device moot. This may be done by removing the mobile key from a database encompassing all active mobile keys for that electronic lock, for instance.

Figure 5:
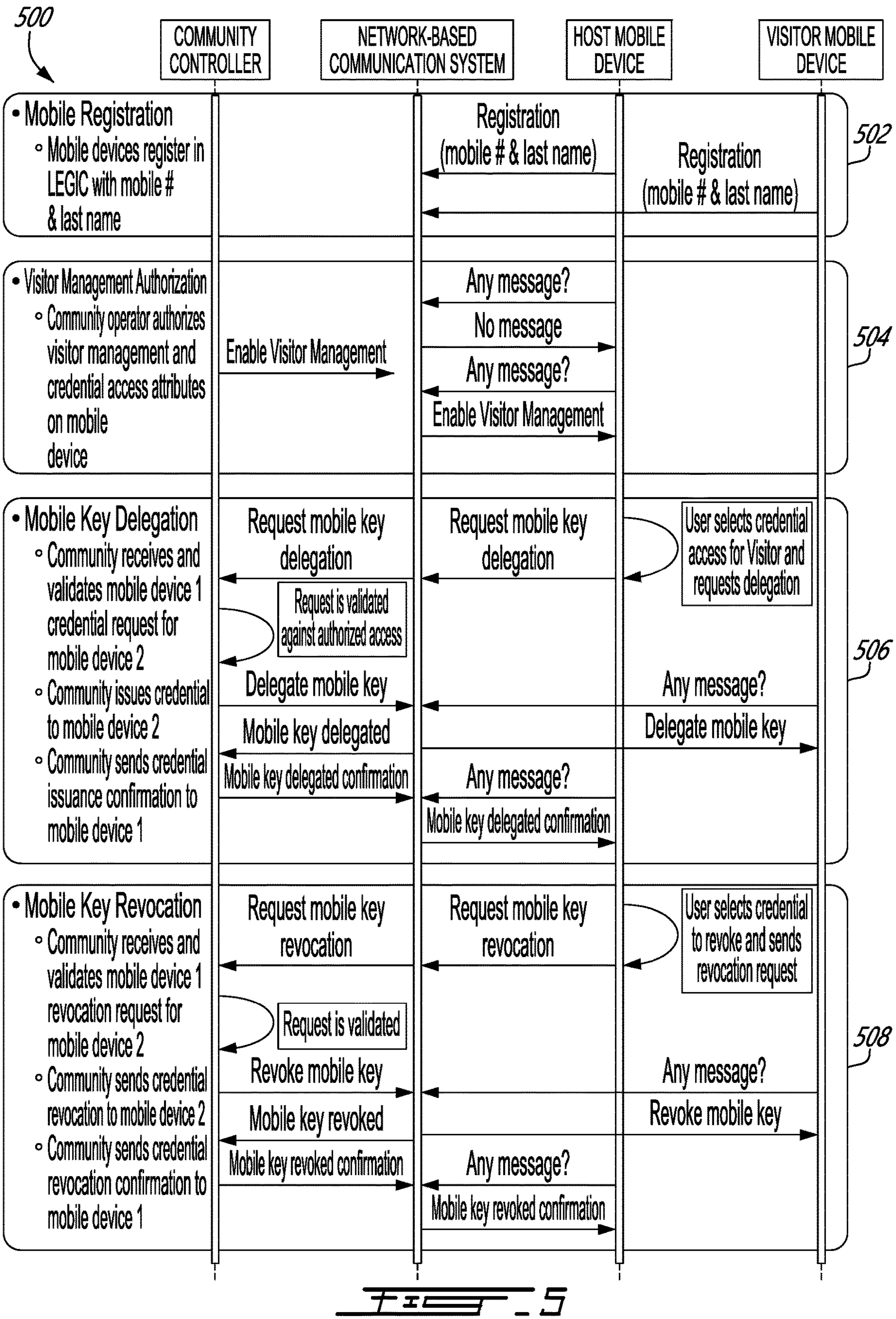
FIG. 5 is a sequence diagram showing an implementation of a method of operating an electronic lock, in accordance with one or more embodiments.

FIG. 5 shows an example of a sequence diagram 500 illustrating an electronic lock system, in accordance with one or more embodiments. As depicted, the electronic lock system has a number of layers communicating with each other, including a community controller, a network-based communication system, a host mobile device and a visitor mobile device.

Block 502 shows an example of a mobile device registration workflow. In this workflow, the host mobile device is registered with respect to the network-based communication system. The registration process can be performed by inputting host user profile information including, but not limited to, a phone number an identifier (e.g., the last name of the host user) associated to the host mobile device. The visitor mobile device is also registered with respect to the network-based communication system. The registration process can be performed by inputting visitor user profile information including, but not limited to, a phone number an identifier (e.g., the last name of the visitor user) associated to the visitor mobile device. The registration of the host and visitor mobile devices can be performed one after the other in some embodiments, or simultaneously in some other embodiments. Typically, the host mobile device is registered with respect to the network-based communication system well before the registration of the visitor mobile device. In some embodiments, the registration workflow is embodied by a dedicated software app which can be downloaded on the memory of the host or visitor mobile device via an online application store, for instance. On that software app, fields for the user profile information are displayed to collect information relevant to the registration of the user. For instance, new user registration fields and/or existing user log in fields may be prompted to the user.

Block 504 shows an example of a mobile key management privilege workflow. In this workflow, the community controller may enable mobile key management privilege for the host mobile device via the network-based communication system. As will be discussed below, when the host mobile device is enabled with mobile key management privilege, the host mobile device can share mobile key(s) to visitor mobile device(s) unlocking corresponding electronic locks for a given period of time and cancel the shared mobile key(s) when desired. The enabling of the mobile key management privilege can be performed upon receiving a corresponding request from the host mobile device via the software app.

Block 506 shows an example of a mobile key delegation workflow. In this workflow, the host user inputs visitor user profile information via the software app and requests mobile key delegation to that visitor user so as to share mobile key(s) with the visitor mobile device. The visitor user profile information are then communicated to the community controller via the network-based communication system. The community controller then verifies whether the host mobile device has mobile key management privilege. If yes, requested mobile key(s) are communicated to the visitor mobile device via the network-based communication system. When this step has been performed, the community controller communicates a success message to the host mobile device.

Block 508 shows an example of a mobile key canceling workflow. In this workflow, the host user inputs which one of the shared mobile key(s) (or all of them) are to be canceled via the software app and requests cancelation thereof. The information relating to the request to cancel the mobile key(s), along with the request itself, are communicated to the community controller via the network-based communication system. The community controller then verifies whether the host mobile device has mobile key cancelation privilege. If yes, the relevant mobile key(s) are canceled. In some embodiments, the community controller sends instructions of deleting the relevant mobile key(s) to the software app of the visitor mobile device. Once these instructions have been executed by the visitor mobile device, a success message is sent to the community controller via the network-based communication system and then to the host mobile device.

In some embodiments, the software app is BlueSky® app provided by dormakaba Canada Inc.®, an existing product typically used in lodging markets to allow end uses to receive and hold mobile key(s) on mobile device(s) of host users and/or visitor users. The BlueSky® app can be used in the hospitality mode and multi-housing mode (e.g., gated communities), where the user is typically a guest in the hospitality mode or a resident or staff in the multi-housing mode. In some embodiments, the BlueSky® app has a feature adding a functionality allowing host users such as residents and staff members to request, receive and communicate mobile key(s) for their visitors in the multi-housing mode. This feature is preferably managed by community controller. The added functionality would not be enabled for users in the hospitality mode, for instance. The mobile key(s) can take two example forms: a PIN or an electronic wallet pass. In each case, there may be limited access rights such as number of uses, time of day, days of week and an expiry to the PIN or electronic wallet pass. As PIN can be requested by staff members working at the gated community, for instance, in order to allow contractors to access at least some of the community assets, the electronic wallet pass may be requested by residents.

The host user typically downloads the software app to their mobile device with either iOS or Android OS and Bluetooth Low Energy (BLE) or equivalent wireless communication protocols. The host user and the visitor user may accept to receive a mobile key in the software app. The host user may input a request for mobile key delegation for one or more visitors. The host user is typically responsible for any access they request for other individuals, as they have the ability to distribute the mobile key(s) as desired. Thus, access by the visitor users may be logged as “visitor of host user X”. The “visitor for host user X” wishing to receive a mobile key may also download the software app on their mobile device.

The community controller has appropriate rights which can turn on or off each resident’s and staff member’s ability to manage their own visitor access by PIN and/or electronic wallet pass. If it is off the software app will be limited to the screens for using already existing mobile key(s). If on then the resident’s or staff member’s software app may have many additional screens for visitor mobile key management. The community controller can also set the min, max & default parameters the residents and staff members will see in their selection options for the visitor’s access rights. Examples of such parameter can include, but not limited to, for PIN: maximum number of uses, min/max duration, time constraint options, etc.; and for electronic wall pass: min/max duration, time constraint options, etc. These min/max default parameters can be what is displaced to the software app user in the app as they select their visitor’s access. These parameters can be common across the whole gated community. These system level default parameters can be overridden and configured for each specific resident and staff member in their corresponding user profile information in the software app. The community controller can also provide for setting a limit to the maximum number of concurrent visitors a resident or staff member can have and also for canceling the privilege from the resident or staff member if it is abused. Finally, the community controller manages mobile key(s) in a similar fashion with doors or groups of doors the resident or staff member may give access to some visitor users. The community controller can receive request(s) from the software app for each discrete access, including any visitor user profile information including name and phone number associated with a request that the host user may have typed in. This name or “label” can in addition to the host user identifier be what is referenced for the access transactions and show up in reports, e.g., an access record for a given door could be: Jan. 14, 2021 11:48 AM PIN access 123* visitor “Bob” for unit 304** resident “Jim”. Note, the communication protocols used for all communication between the community controller and the software apps can be the Legic Connect® trusted service cloud, ensuring security for all communications.

A host resident or staff member equipped with the dedicated software app can see the app augmented with additional screens for visitor management once the corresponding host user has been given the right from the community controller. The software app user can use the app tow request visitor access. The host user may first choose between PIN & electronic wall pass. Typically, PIN may be limited to limited use, short duration, e.g., a delivery and mobile key is favored for longer term/recurring access e.g., a weekly cleaning person or dog walker. If a mobile key is selected then the phone number (or other visitor user profile information) of the intended recipient is needed, and that person may need to download the dedicated software app as well. They may give the visitor user a name identifying this specific access right, select the parameters and the doors to which the visitor user is to have access. Once configured the host user can make the request. The request flow from the dedicated software app to the community controller over the network-based Legic Connect communication system. Once received, the community controller assesses the request and generates the PIN or mobile key based on the assessment. The community controller may then send the confirmation back to the host user to be relieved in the software app, again funneled over the network-based communication system. If a PIN then the host user can then send a message to the visitor via SMS or email or other applications. The software app user can see from his app all mobile key(s) they have issued, allowing them to keep track. They can also request that an access be canceled early, e.g., before it's expiry, which would create a new request that would flow back to the community controller for approval thereof.

As can be understood, the examples described above and illustrated are intended to be exemplary only. The scope is indicated by the appended claims.

What is claimed is:

1. A method of operating an electronic lock locking a community asset and controlled by a community controller via a network, the community controller being communicatively coupled to a first mobile device and to a second mobile device, the method comprising:
 the community controller communicating a mobile key unlocking the electronic lock to the first mobile device, the community controller having a database listing all active mobile keys for the electronic lock;
 the community controller receiving, from the second mobile device, a request to cancel the mobile key communicated to the first mobile device, the first mobile device being associated to first user profile information and the second mobile device being associated to second user profile information different from the first user profile information; and
 the community controller assessing the request and canceling the mobile key communicated to the first mobile device based on said assessing;
 wherein said canceling removes the mobile key from the database of the community controller.

2. The method of claim 1 wherein said canceling further includes the community controller instructing the first mobile device to delete the mobile key.

3. The method of claim 1 wherein said canceling further includes the community controller rendering the mobile key moot.

4. The method of claim 1 wherein said assessing includes the community controller determining whether the second mobile device has a mobile key cancelation privilege.

5. The method of claim 1 further comprising the community controller communicating a mobile key unlocking the electronic lock to the second mobile device, said assessing including the community controller determining whether the second mobile device also has the mobile key unlocking the electronic lock.

6. The method of claim 1 wherein the community controller and the second mobile device communicate with one another via the network using a secure communication protocol.

7. The method of claim 1 wherein the mobile key is provided in the form of at least one of a personal identification number (PIN) and an electronic wallet pass.

8. An electronic lock system for controlling access to a community asset, the system comprising:
 an electronic lock locking the community asset;
 a community controller being communicatively coupled to the electronic lock, a first mobile device and a second mobile device via a network, the first mobile device having a mobile key unlocking the electronic lock stored on a memory thereof and first user profile information, the second mobile device having second user profile information different from the first user profile information, the community controller having a processor and a memory having stored thereon a database listing all active mobile keys for the electronic lock, and instructions that when executed by the processor perform the steps of:
  receiving, from the second mobile device, a request to cancel the mobile key of the first mobile device;
  assessing the request and canceling the mobile key of the first mobile device based on said assessing;
 wherein said canceling removes the mobile key from the database of the community controller.

9. The electronic lock system of claim 8 wherein said canceling further includes the community controller instructing the first mobile device to delete the mobile key.

10. The electronic lock system of claim 8 wherein said canceling further includes the community controller rendering the mobile key moot.

11. The electronic lock system of claim 8 wherein said assessing includes the community controller determining whether the second mobile device has a mobile key cancelation privilege.

12. The electronic lock system of claim 8 further comprising the community controller communicating a mobile key unlocking the electronic lock to the second mobile device, said assessing including the community controller determining whether the second mobile device also has the mobile key unlocking the electronic lock.

13. The electronic lock system of claim 8 wherein the community controller and the second mobile device communicate with one another via the network using a secure communication protocol.

14. A method of operating an electronic lock locking a community asset and in communication to a network-based communication system, the method comprising:
 communicatively coupling a first mobile device to the network-based communication system using first user profile information, the first mobile device having stored on a memory thereof a mobile key unlocking the electronic lock;
 communicatively coupling a second mobile device to the network-based communication system using second user profile information different from the first user profile information; and
 the second mobile device transmitting a request to cancel the mobile key of the first mobile device to the network-based communication system, the network-based communication system having a database listing all active mobile keys for the electronic lock;
 wherein said request to cancel includes a request to remove the mobile key from the database of the network-based communication system.

15. The method of claim 14 further comprising, upon accepting the request to cancel the mobile key, the first mobile device receiving from the network-based communication system an instruction to delete the mobile key from the memory of the first mobile device.

16. The method of claim 14 further comprising, upon accepting the request to cancel the mobile key, rendering the mobile key moot.

17. The method of claim 14 further comprising, prior to said transmitting the request to cancel the mobile key, transmitting a request to grant the mobile key to the first mobile device to the network-based communication system.

* * * * *